(12) United States Patent
Shrestha

(10) Patent No.: US 12,518,864 B2
(45) Date of Patent: Jan. 6, 2026

(54) DIGITAL HEALTH MAP LOCALIZATION AND FORECASTING

(71) Applicant: Dox Health, Inc., Acton, MA (US)

(72) Inventor: Rajiv P. Shrestha, Boston, MA (US)

(73) Assignee: Dox Health, Inc.

( * ) Notice: Subject to any disclaimer, the term of this patent is extended or adjusted under 35 U.S.C. 154(b) by 29 days.

(21) Appl. No.: 18/400,576

(22) Filed: Dec. 29, 2023

(65) Prior Publication Data

US 2024/0136043 A1  Apr. 25, 2024

Related U.S. Application Data

(63) Continuation of application No. PCT/US2022/035688, filed on Jun. 30, 2022.

(60) Provisional application No. 63/217,446, filed on Jul. 1, 2021.

(51) Int. Cl.
| | | |
|---|---|---|
| *G16H 20/30* | (2018.01) | |
| *G16H 10/60* | (2018.01) | |
| *G16H 20/60* | (2018.01) | |
| *G16H 20/70* | (2018.01) | |
| *G16H 40/67* | (2018.01) | |

(52) U.S. Cl.
CPC ............ *G16H 20/30* (2018.01); *G16H 10/60* (2018.01); *G16H 20/60* (2018.01); *G16H 20/70* (2018.01); *G16H 40/67* (2018.01)

(58) Field of Classification Search
CPC ........ G16H 20/30; G16H 20/60; G16H 20/70; G16H 10/60; G16H 40/67
USPC .......................................................... 705/3
See application file for complete search history.

(56) References Cited

U.S. PATENT DOCUMENTS

| | | | |
|---|---|---|---|
| 11,127,506 B1 * | 9/2021 | Jain | ................ H04W 4/021 |
| 2013/0095459 A1 | 4/2013 | Tran | |
| 2015/0265164 A1 | 9/2015 | Gopalakrishnan et al. | |
| 2015/0289820 A1 | 10/2015 | Miller et al. | |

(Continued)

FOREIGN PATENT DOCUMENTS

WO  WO-2017044638 A1 *  3/2017  ......... A61B 5/02433

OTHER PUBLICATIONS

Nag, Nitish et al; Cross-Modal Health State Estimation; 2018 ACM Multimedia Conference (MM '18), Oct. 22-26, 2018, Seoul, Republic of Korea Authors: (Year: 2018).*

(Continued)

*Primary Examiner* — Hiep V Nguyen
(74) *Attorney, Agent, or Firm* — Foley & Lardner LLP

(57) ABSTRACT

Systems and methods for generating a digital health map is provided. A system can receive, for a subject, baseline data for a first time interval comprising health metrics, behavioral metrics, and physical metrics. The system can establish, via a model, a current location of the subject on a digital health map based on at least one of the health metrics, the behavioral metrics, or the physical metrics. The system can determine, based on the model and one or more prescribed actions, a predicted path extending from the current location for a second time interval after the first time interval. The system can update the digital health map with the predicted path for the one or more prescribed actions. The system can transmit, to a computing device, the digital health map to cause the computing device to render the digital health map via a display device coupled to the computing device.

20 Claims, 9 Drawing Sheets

(56) References Cited

U.S. PATENT DOCUMENTS

2017/0080207 A1   3/2017  Perez et al.
2021/0104173 A1*  4/2021  Pauley ................... G16H 20/10

OTHER PUBLICATIONS

Sangeeta Bhatia et al.; Using digital surveillance tools for near real-time mapping of the risk of infectious disease spread; npj Digital Medicine (2021) 4:73 ; https://doi.org/10.1038/s41746-021-00442-3 (Year: 2021).*
International Search Report and Written Opinion on PCT Appln. PCT/US2022/35688 dated Oct. 5, 2022.

* cited by examiner

700

| Prediction of Patient response to exercise prescription |
|---|

User health information

Patient Name [First] [Last]
Gender ☑Male ☐Female
Height Feet[5] Inches[5]
Age in years [45] Weight in pounds[169]
[Click for Body Mass Index] (BMI)[28]
Resting Heart Rate [77]
Lifestyle Activity Level:
☑1 ☐2 ☐3 ☐4 ☐5 ☐6
[Click for activity level reference]
[Estimate Daily Calorie Requirement for]
weight maintenance [2214]
[Open User Baseline FPG Data]

| Date | M 1 | M 2 | M 3 | Avg | Rem |
|---|---|---|---|---|---|
| 25-Mar-2019 | 99 | 106 | 109 | 104... | 170 |
| 28-Mar-2019 | 104 | 104 | 103 | 103... | NaN |
| 02-Apr-2019 | 100 | 98 | 97 | 98.3... | NaN |
| 05-Apr-2019 | 109 | 110 | 107 | 108... | NaN |

[Compute Baseline Stats]
Baseline FPG stats (mg/dL):

| Mean | Median | 25th Percentile | 75th Perc |
|---|---|---|---|
| 102.4700 | 103 | 98.2500 | 106 |

[Estimate Baseline A1c %]
Estimated Baseline A1c (%):

| Mean | 25th Percentile | 75th Percentile |
|---|---|---|
| 5.2300 | 5.0600 | 5.4100 |

Exercise prescription

1. Exercise Dose per week [Clear Values]
☑90 min ☐120 min ☑150 min
☐180 min ☑210 min ☐240 min
[Predict FPG trajectory for: Patient Name]
[Predict FPG trajectory chosen dose] [0]

2. Exercise intensity: Moderate
[Click for heart rate (HR) range]
Moderate intensity HR range for you:

| Min HR | Max HR |
|---|---|
| 117 | 135 |

3. Weight loss goal in 6 months (%) [7]
[Click for target weight and caloric intake]
Target weight [0]
Target daily caloric deficiency [0]
Target daily caloric intake [0]

Predicted outcome in numbers
1. Average reduction in FPG (mg/dL)
Dose 1 [0] Dose 2 [0] Dose 3 [0]
Dose 4 [0] Dose 5 [0] Dose 6 [0]
2. Average reduction in A1c %
Dose 1 [0] Dose 2 [0] Dose 3 [0]
Dose 4 [0] Dose 5 [0] Dose 6 [0]

User health progress data

[Open User FPG Data]

| Date | M 1 | M 2 | M 3 | Avg | Rem |
|---|---|---|---|---|---|

Time [Choose one ▼]  Data [Choose one ▼]
[Plot UserFPG data]  Smooth factor [9 ▼]
[Re-estimated fit]
[Compute Final FPG Stats] Use last [6 ▼] points
Average reduction in FPG (mg/dL) [0]
[Open User Weight Data]

| Date | Wt | Colu |
|---|---|---|

[Plot User Weight Data]
Average reduction in wt (lbs) [0]
Final Weight [0]
User A1c data (%) [0]

FIG. 7

DIGITAL HEALTH MAP LOCALIZATION AND FORECASTING

CROSS-REFERENCE TO RELATED APPLICATIONS

This application claims the benefit of priority under 35 U.S.C. § 120 as a continuation of International Patent Application No. PCT/US2022/035688, filed Jun. 30, 2022, and designating the United States, which claims the benefit of priority under 35 U.S.C. § 119 to U.S. Provisional Application No. 63/217,446, filed Jul. 1, 2021, titled "DIGITAL HEALTH MAP LOCALIZATION AND FORECASTING," each of which is incorporated herein by reference in its entirety.

FIELD OF THE DISCLOSURE

This disclosure generally relates to generating a digital health map, determining a current location of a subject on the digital health map, and forecasting or predicting a trajectory or future path for the subject on the digital health map.

BACKGROUND OF THE DISCLOSURE

A subject's health status can be assessed based on one or more health parameter/s or metric/s. The subject can follow certain health intervention/s to improve their health status. However, since different subjects can respond to health interventions in different ways, it can be challenging to process the parameters or metrics of a subject to recommend an effective intervention tailored to the particular subject.

SUMMARY OF THE DISCLOSURE

Systems, methods, and apparatus of this technical solution are directed to generating a digital health map, determining a current location of a subject on the digital health map, and forecasting or predicting a trajectory or future path for the subject on the digital health map. This disclosure can provide systems, methods, and apparatus to treat, mitigate, or prevent diseases in subjects. For example, the technical solution of this disclosure can generate, update, train or use a statistical model of actionable health interventions to cause an optimal health outcome for a subject using a digital health map based on the current location of the subject on the digital health map, a predicted path of the health improvement over time for the subject, and a predicted final destination for the subject on the digital health map.

As opposed to a one-size fits all qualitative approach, this technical solution can provide a personalized quantitative approach to users or patients about how one's body responds to medical/health interventions over time. This technical solution can take into account multiple response parameters and metrics to assess health status or diagnose diseases and ascertain an improved health outcome.

At least one aspect of this disclosure is directed to a system for localization on a digital health map. The system can include a data processing system having memory and one or more processors. The data processing system can receive, for a subject, baseline data for a first time interval comprising health metrics, behavioral metrics, physical metrics, and demographic information. The data processing system can establish, via a model, a current location of the subject on a digital health map based on at least one of the health metrics, the behavioral metrics, the physical metrics, or the demographic metrics. The data processing system can determine, based on the model, baseline data, current location, and one or more prescribed actions for the subject, a predicted path extending from the current location for a second time interval after the first time interval. The data processing system can update the digital health map with the predicted path for the one or more prescribed actions for the subject. The data processing system can transmit, to a computing device of the subject, the digital health map to cause the computing device to render the digital health map via a display device coupled to the computing device.

In implementations, the data processing system can receive, from one or more network connected devices that are communicatively coupled to the data processing system, the health metrics comprising at least one of body weight, resting heart rate, daily sleep duration, number of steps, fasting blood sugar concentration, A1C %, or blood pressure.

The data processing system can receive the behavioral metrics comprising at least one of a daily caloric intake, a daily number of steps, a duration of physical activity, a frequency of physical activity, an intensity of physical activity, or a daily duration of sleep.

The data processing system can receive the physical metrics comprising at least one of an age or height. The data processing system can receive biological metrics comprising at least one of gender or genetic information. The data processing system can receive demographic information comprising at least one of ethnicity or race. The data processing system can receive the baseline data comprising blood sugar and blood pressure values for the subject over the time interval, resting heart rate values for the subject over the time interval, an indication of a sex of the subject and other demographic information, a body weight of the subject within the time interval, a daily caloric intake for the subject within the time interval, a duration of physical activity, a frequency of physical activity, an intensity of physical activity, a daily sleep duration and a daily number of steps taken by the subject within the time interval.

The data processing system can generate the digital health map using the model based on a non-linear function or a linear function. The data processing system can generate the digital health map using the model based on an ordinary differential equation. The data processing system can generate the digital health map using the model based on a machine learning technique or a neural network technique.

In implementations, the one or more prescribed actions comprise at least one of a duration and frequency of physical activity, an intensity of the physical activity, a daily sleep duration, a daily number of steps, or a daily caloric intake, or daily number of steps or daily sleep duration. The data processing system can generate, based on the model, an upper bound and a lower bound for the predicted path, wherein the upper bound and the lower bound represent an expected variability in data received for the subject.

At least one aspect of this disclosure is directed to a system to reduce fasting blood sugar levels in a subject to prevent an onset of diabetes or manage diabetes in the subject. The system can include a data processing system comprising memory and one or more processors. The data processing system can receive, for a subject, baseline data for a first time interval. The baseline data can include health metrics comprising a body weight, resting heart rate, fasting blood sugar concentration, and A1C %. The baseline data can include behavioral metrics comprising comprising daily caloric intake, daily number of steps, a duration of physical activity, a frequency of physical activity, an intensity of physical activity, and a daily sleep duration. The baseline data can include physical metrics comprising age, height, weight and other demographic information. The baseline data can include biological and demographic information comprising gender, race, and ethnicity The data processing system can establish, via a model, a current location of the subject on a digital health map based on the health metrics, the behavioral metrics, the physical metrics, or the biological and demographic information. The data processing system can determine, based on the model, one or more prescribed actions comprising an exercise duration, an exercise frequency, an exercise intensity, a daily caloric intake, a daily number of steps, and a daily duration of sleep. The data processing system can generate, based on the model, baseline data, current location, and the one or more prescribed actions, a predicted path extending from the current location on the digital health map for a second time interval after the first time interval. The data processing system can update the digital health map with the predicted path for the one or more prescribed actions for the subject. The data processing system can transmit, to a computing device of the subject, the digital health map to cause the computing device to render the digital health map via a display device coupled to the computing device.

In implementations, the data processing system can determine a dose for the subject comprising the one or more prescribed actions. The data processing system can receive at least a portion of the baseline data from a wearable network-connected device.

At least one aspect of this disclosure is directed to a system to compute a digital health map of one or more health metrics. The system can include a data processing system comprising memory and one or more processors. The data processing system can receive, for a user, baseline data for a baseline time period comprising a) health metrics, b) behavioral metrics, c) physical metrics, d) biological metrics, and/or demographic information. The data processing system can establish, via a model, an initial value or a position of the user on the digital health map based on at least one of the baseline data. The data processing system can compute one or more of the health metrics for the user. The data processing system can compute one or more health metrics based on a) the baseline data, b) one or more prescribed actions for the user, and c) a model, predicted graphs corresponding to the prescribed actions of the health metrics for a second time interval (or health transformation period) extending from the current location after the baseline period to the respective final values (or destinations) at the end of the second time interval in the digital health map. The data processing system can transmit, to a computing device of the user, the digital health map comprising the current location, predicted health paths, and the destinations, to cause the computing device to render the digital health map via a display device coupled to the computing device.

At least one aspect of this disclosure is directed to a system to reduce fasting blood sugar levels in a user to prevent it from reaching the levels that are clinically defined as the ranges for prediabetes and diabetes or manage the fasting blood sugar levels that are already in such ranges in the user. The system can include a data processing system comprising memory and one or more processors. The data processing system can receive for a user through the user input or from one or more network connected devices that are communicatively coupled to the data processing system, baseline data for a baseline period. The baseline data can include health metrics comprising at least one of a) body mass index ("BMI"), b) health risk, c) resting heart rate, d) current heart rate, e) fasting blood sugar concentration, and/or f) A1C %. The baseline data can include behavioral metrics comprising at least one of a) a daily caloric intake, b) number of steps, c) frequency, duration, and intensity of activities or exercise, and/or d) duration and/or quality of sleep. The baseline data can include physical metrics comprising at least one of a) an age, b) a height, c) a body weight, d) muscle mass, and/or e) body fat percentage. The baseline data can include biological metrics comprising at least one of a) gender and/or b) genetic information. The baseline data can include demographic information. The data processing system can establish, via a model, a current location of the user on a digital health map based on at least one of the baseline data. The data processing system can compute, for the health metric (e.g., fasting blood glucose) for the user, one or more predicted health paths of the health metric corresponding to prescribed actions during a health transformation period extending from the current location after the baseline period to a respective destination at the end of the health transformation period in the digital health map. The data processing system can determine the health metric for the predicted paths based on a) at least one of the Baseline Data, b) one or more Prescriptions, and c) a model. The data processing system can transmit, to a computing device of the user, the digital health map. The digital health map can include the current location, predicted health paths, and the destinations. The computing device, upon receiving the digital health map, can render the digital health map via a display device coupled to the computing device.

At least one aspect of this disclosure is directed to a system to reduce or manage A1c % levels in a user to either prevent the A1c % level from reaching a threshold for prediabetes and diabetes, or maintain the user current A1c % level. The system can include a data processing system comprising memory and one or more processors. The data processing system can receive for a user through the user input or from one or more network connected devices that are communicatively coupled to the data processing system, baseline data for a baseline period. The baseline data can include health metrics comprising one or more of a) body mass index (BMI), b) health risk, c) resting heart rate, d) current heart rate, e) fasting blood sugar concentration, and/or f) A1C %. The baseline data can include behavioral metrics comprising one or more of a) a daily caloric intake, b) number of steps, c) frequency, duration, and intensity of activities or exercise, and/or d) duration and quality of sleep. The baseline data can include physical metrics comprising one or more of a) an age, b) a height, c) a body weight, d) muscle mass, and/or e) body fat percentage. The baseline data can include biological metrics comprising at least one of a) gender, or b) genetic information. The baseline data can include demographic information. The data processing system can establish, via a model, a current location of the user on a digital health map based on at least a part of the baseline data. The data processing system can determine, based on prescribed actions, predicted health paths for the A1c % health metric for the user during a health transformation period extending from the current location after the baseline period to respective destinations at the health transformation period. The data processing system can determine the predicted health paths for the A1c % health metric for the user based on a) the baseline data, b) one or more prescribed actions, and c) a model. The data processing system can transmit, to a computing device of the user, the digital health map indicating the current location, predicted health paths, and the destinations. The computing device can render the digital health map via a display device coupled to the computing device.

At least one aspect of this disclosure is directed to a system to reduce or manage weight or body mass index (BMI) in a subject (e.g., a user) to prevent the BMI level from reaching a threshold for obesity (e.g., prevent an onset of obesity in the subject), or maintain the current BMI level of the subject. The system can include a data processing system comprising memory and one or more processors. The data processing system can receive baseline data for a first time interval (e.g., a baseline period) for the subject (e.g., via the user input or from one or more network connected devices that are communicatively coupled to the data processing system). The baseline data can include health metrics comprising one or more of a) body mass index (BMI), b) health risk, c) resting heart rate, d) current heart rate, e) fasting blood sugar concentration, and/or f) A1C %. The baseline data can include behavioral metrics comprising one or more of a) a daily caloric intake, b) number of steps, c) frequency, duration, and intensity of activities or exercise, and/or d) duration and quality of sleep. The baseline data can include physical metrics comprising one or more of a) an age, b) a height, c) a body weight, d) muscle mass, and/or e) body fat percentage. The baseline data can include biological metrics or information comprising at least one of a) gender or b) genetic information. The baseline data can include demographic information comprising at least one of a) race or b) ethnicity. The data processing system can establish, via a model, a current location of the subject on a digital health map based on at least a part of the baseline data (e.g., the health metrics, the behavioral metrics, the physical metrics, or the biological and demographic information). The data processing system can determine, based on the model, one or more prescribed actions comprising an exercise duration, an exercise frequency, an exercise intensity, and a daily caloric intake. The data processing system can determine, based on the model and the one or more prescribed actions, a predicted path (e.g., health path) for the BMI health metric for the subject during a health transformation period extending from the current location on the digital health map after the baseline period to respective destinations at the health transformation period (e.g., for a second time interval). The data processing system can determine the predicted health paths for the BMI health metric for the subject based on at least one of a) the baseline data, b) one or more prescribed actions, or c) a model. The data processing system can update the digital health map with the predicted path for the one or more prescribed actions for the subject. The data processing system can transmit, to a computing device of the subject, the digital health map indicating the current location, predicted health paths, and the destinations to cause the computing device to render the digital health map via a display device coupled to the computing device.

The data processing system can determine a dose for the subject comprising the one or more prescribed actions. The data processing system can receive at least a portion of the baseline data from a wearable network-connected device.

At least one aspect of this disclosure is directed to a system to reduce or manage systolic and/or diastolic blood pressure levels in a subject (e.g., a user) to either prevent the blood pressure level from reaching a threshold for hypertension. The system can include a data processing system comprising memory and one or more processors. The data processing system can receive baseline data for a first time interval (e.g., a baseline period) for the subject (e.g., through the user input or from one or more network connected devices that are communicatively coupled to the data processing system. The baseline data can include health metrics comprising one or more of a) body mass index (BMI) (or body weight), b) health risk, c) resting heart rate, d) current heart rate, e) systolic and diastolic blood pressure. The baseline data can include behavioral metrics comprising one or more of a) a daily caloric intake, b) number of steps, c) frequency, duration, and intensity of activities or exercise, and/or d) duration or quality of sleep. The baseline data can include physical metrics comprising one or more of a) an age, b) a height, c) a weight (e.g., body weight), d) muscle mass, and/or e) body fat percentage. The baseline data can include biological metrics comprising at least one of a) gender or b) genetic information. The baseline data can include demographic information comprising at least one of a) race or b) ethnicity. The data processing system can establish, via a model, a current location of the subject on a digital health map based on at least a part of the baseline data (e.g., the health metrics, the behavioral metrics, the physical metrics, or the biological and demographic information). The data processing system can determine, based on the model, one or more prescribed actions comprising an exercise duration, an exercise frequency, an exercise intensity, and a daily caloric intake. The data processing system can generate or determine, based on the model and the one or more prescribed actions, a predicted path (e.g., predicted health path) for the blood pressure health metrics for the subject during a health transformation period extending from the current location on the digital health map after the baseline period to respective destinations at the health transformation period (e.g., for a second time interval after the first time interval). The data processing system can determine the predicted health paths for the blood pressure health metrics for the subject based on a) the baseline data, b) one or more prescribed actions, and c) a model. The data processing system can update the digital health map with the predicted path for the one or more prescribed actions for the subject. The data processing system can transmit, to a computing device of the subject, the digital health map indicating the current location, predicted health paths, and the destinations to cause the computing device to render the digital health map via a display device coupled to the computing device.

The data processing system can determine a dose for the subject comprising the one or more prescribed actions. The data processing system can receive at least a portion of the baseline data from a wearable network-connected device.

At least one aspects of this disclosure is directed to a system to reduce or manage a health metric comprising a health risk level for a user. The system can include a data processing system comprising memory and one or more processors. The data processing system can receive for a user through user input or from one or more network connected devices that are communicatively coupled to the data processing system, baseline data for a baseline period. The baseline data can include health metrics comprising at least one of a) body mass index (BMI), b) health risk, c) resting heart rate, d) current heart rate, e) fasting blood sugar level, f) A1c %, g), systolic and diastolic blood pressures. The baseline data can include behavioral metrics comprising at least one of a) a daily caloric intake, b) number of steps, c) frequency, duration, and intensity of activities or exercise, or d) duration and quality of sleep. The baseline data can include physical metrics comprising at least one of a) an age, b) a height, c) a body weight, d) muscle mass, or e) body fat percentage. The baseline data can include biological metrics comprising at least one of a) gender or b) genetic information. The baseline data can include demographic information. The data processing system can establish, via a model, a current location of the user on a digital health map based on at least a part of the baseline data. The data processing system can compute predicted health paths of a health risk level based on prescribed actions for a health transformation period extending from the current location after the baseline period to respective destinations at an end of the health transformation period in the Digital Health Map. The data processing system can determine the predicted health paths of the health risk level based on at least a part of the baseline data, the prescribed actions, and a model. The data processing system can transmit, to a computing device of the user, the digital health map with the current location, predicted health paths, and the destinations. The computing device can render the digital health map via a display device coupled to the computing device.

At least one aspect of this disclosure is directed to a method for localization on a digital health map. The method can be performed by a data processing system comprising memory and one or more processors. The method can include the data processing system receiving for a user, baseline data for a baseline period comprising at least one of a) health metrics, b) behavioral metrics, c) physical metrics, d) biological metrics, or e) demographic information. The method can include the data processing system establishing, via a model, a current location of a health metric of the user on a digital health map based on at least a part of the baseline data. The method can include the data processing system computing, for one or more health metrics for the user, predicted health paths for a transformation period extending from the current location after the baseline period to respective destinations at an end of the health transformation period in the digital health map. The data processing system can determine the predicted health paths based on at least a part of the baseline data, one or more prescribed actions for the health transformation period, and a model. The method can include the data processing system transmitting, to a computing device, the digital health map comprising the current location, predicted health paths, and the destinations. The computing device can render the digital health map via a display device coupled to the computing device.

In implementations, the method can include the data processing system receiving, from one or more network connected devices that are communicatively coupled to the data processing system, the health metrics comprising at least one of body weight, resting heart rate, fasting blood sugar concentration, A1C %, or blood pressure. The method can include the data processing system receiving the behavioral metrics comprising at least one of a daily caloric intake or a daily number of steps. The data processing system can receive the physical metrics comprising at least one of an age or height. The data processing system can receive demographic information.

The method can include the data processing system receiving the baseline data including blood sugar values for the subject over the time interval, A1c % values for the subject over the time interval, blood pressure values for the subject over the time interval, resting heart rate values for the subject over the time interval, an indication of a sex and other demographic information of the subject, a body weight/BMI of the subject within the time interval, a daily caloric intake for the subject within the time interval, a daily number of steps taken by the subject within the time interval, and a daily duration and/or quality of sleep within the time interval.

The method can include the data processing system generating the digital health map using the model based on a non-linear function, a linear function, an ordinary differential equation, or a system of ordinary differential equations, a machine learning technique, or a neural network technique. The one or more prescribed actions can include at least one of a duration and frequency of physical activity, an intensity of the physical activity, or a daily caloric intake, or a daily number of steps, or a daily duration of sleep. The method can include the data processing system generating, based on the model, an upper bound and a lower bound for the predicted path, wherein the upper bound and the lower bound represent an expected variability in data received for the subject.

The user can use the digital health map to improve their health metrics associated with the current location on the health, manage the health metrics, or maintain the health metrics, thereby improving the user's health or preventing the worsening of the user's health. Thus, the digital health map of this disclosure can facilitate maintaining or improving the user's health.

The user can use the digital health map to treat a corresponding disease associated with the predicted health path, manage the disease, or prevent the occurrence of the disease, thereby improving the user's health or preventing the worsening of the user's health. Thus, the digital health map of this disclosure can facilitate maintaining or improving the user's health.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims

FIG. 7 depicts an example user interface for inputting data for generation of a digital health map, in accordance with an implementation.

DETAILED DESCRIPTION OF THE DISCLOSURE

Systems, methods, and apparatus of this technical solution are directed to generating a digital health map, determining a current location of a subject on the digital health map, and forecasting or predicting a trajectory or future path for the subject on the digital health map. The technical solution can generate, update, train or use a statistical model of actionable health interventions to cause an optimal health outcome for a subject using a digital health map based on the current location of the subject on the digital health map, a predicted path of the health improvement over time for the subject, and a predicted final destination for the subject on the digital health map.

As opposed to a one-size fits all qualitative approach, this technical solution can provide a personalized quantitative approach to users or patients about how one's body responds to medical/health interventions over time. This technical solution can take into account multiple response parameters and metrics to assess current health status (e.g., diagnose diseases) and ascertain an improved health outcome.

To do so, systems, methods and apparatus of this disclosure can generate a quantitatively personalized digital health map. The technical solution can provide tools and services to locate a current location on the digital health map, and allow a user to choose a healthier destination on the digital health map. The system can provide quantitatively personalized prescription ("QPP") of actionable health interventions. The system, using baseline data and the prescribed actions, can predict a path and timeline to reach the healthier destination on the digital health map, as well as provide the ability to track the journey and stay on the health path. In some cases, the system can create a digital twin of the user with which the user can compete, thereby improving the likelihood that the user can stay on a desired predicted path and reach a desired destination on the digital health map.

Figure 1:
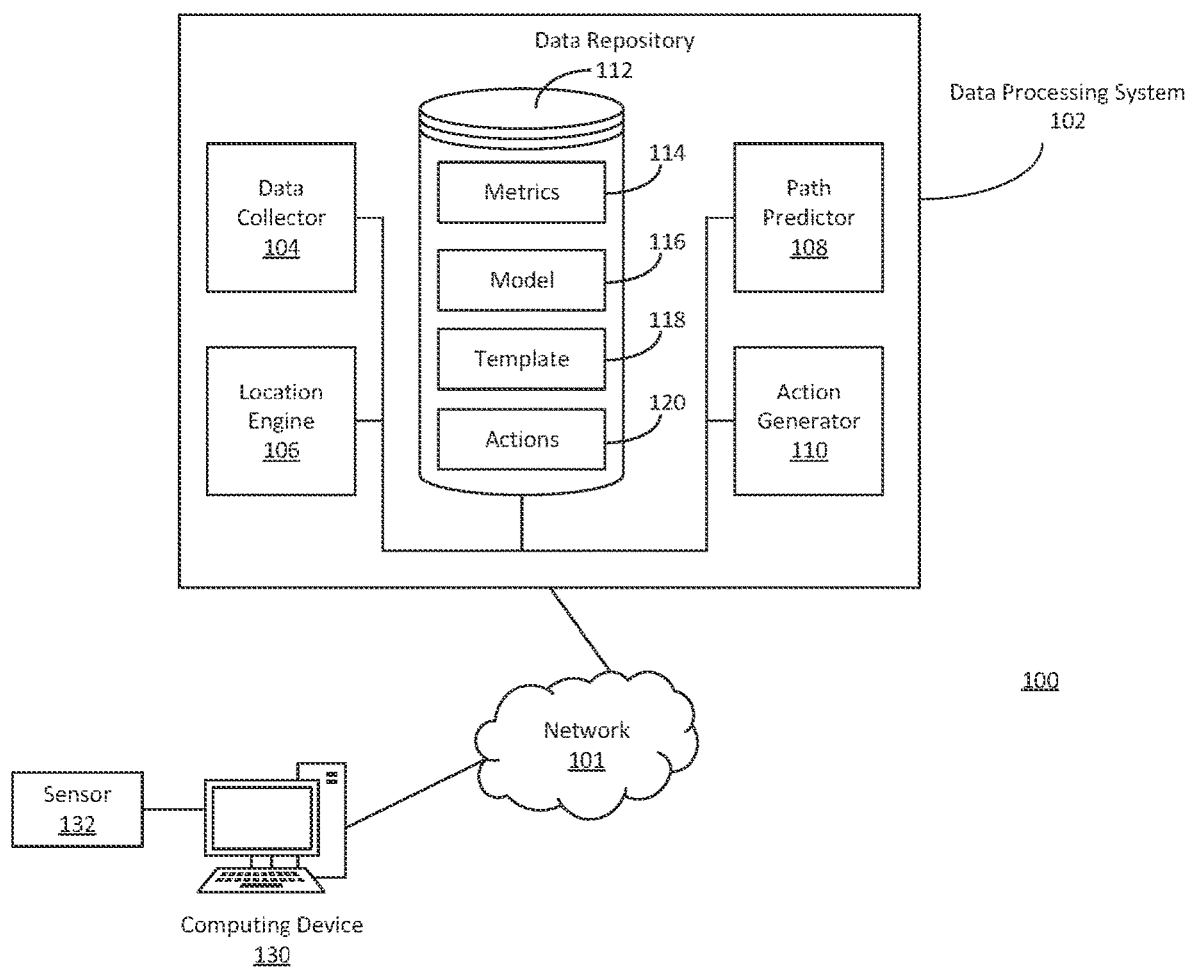
FIG. 1 depicts a block diagram illustrating an example system to generate a digital health map, in accordance with an implementation.

FIG. 1 depicts a block diagram illustrating an example system to generate a digital health map, in accordance with an implementation. The system 100 can include a data processing system 102. The data processing system 102 can communicate with one or more computing devices 130 via a network 101. The network 101 can include computer networks such as the Internet, local, wide, metro, or other area networks, intranets, satellite networks, and other communication networks such as voice or data mobile telephone networks.

The network 101 may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. The network 101 may include a wireless link, such as an infrared channel or satellite band. The topology of the network 101 may include a bus, star, or ring network topology. The network may include mobile telephone networks using any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). Different types of data may be transmitted via different protocols, or the same types of data may be transmitted via different protocols. The network 101 can include a Bluetooth network (e.g., a short-range wireless communication protocol) or nearfield communication.

The data processing system 102 can communicate with a computing device 130 via network 101. The computing device 130 can include, for example, a laptop, desktop, tablet, digital assistant device, smart phone, mobile telecommunication device, portable computers, or wearable device. The computing device 130 can refer to a computing device 130 that is being used by a user or in the possession of a user. In some cases, the computing device 130 can include or refer to a fitness tracker. The computing device 130 can include, interface with, or otherwise access or receive information from one or more sensors 132. The sensor 132 can include, for example, one or more of a heart rate sensor, pedometer that counts steps taken by the user, weighing scale, blood glucose monitor, A1C home kit, blood pressure monitor, location sensor, accelerometer, gyroscope, temperature sensor, or altimeter. The sensor 132 can interface or communicate with the computing device 130 via a network 101, or be integrated or coupled with the computing device 130. In some cases, the sensor 132 can communicate directly with the data processing system 102 via network 101.

The data processing system 102 can include at least one logic device such as a computing device having a processor to communicate via the network 101, for example with the computing device 130. The data processing system 102 can include at least one computation resource, server, processor, or memory. For example, the data processing system 102 can include a plurality of computation resources or servers located in at least one data center. The data processing system 102 can include multiple, logically-grouped servers and facilitate distributed computing techniques. The logical group of servers may be referred to as a cloud, cloud computing environment, data center, server farm or a machine farm. The servers can also be geographically dispersed. A data center or machine farm may be administered as a single entity, or the machine farm can include a plurality of machine farms. The servers within each machine farm can be heterogeneous—one or more of the servers or machines can operate according to one or more type of operating system platform.

Servers in the machine farm can be stored in high-density rack systems, along with associated storage systems, and located in an enterprise data center. For example, consolidating the servers in this way may improve system manageability, data security, the physical security of the system, and system performance by locating servers and high performance storage systems on localized high performance networks. Centralization of all or some of the data processing system 102 components, including servers and storage systems, and coupling them with advanced system management tools allows more efficient use of server resources, which saves power and processing requirements and reduces bandwidth usage.

The data processing system 102 can include at least one data collector 104 designed, constructed and operational to receive data from the computing device 130, or other sources via network 101. The data processing system 102 can include at least one location engine 106 designed, constructed and operational to determine a current location of the user on a digital health map based on the data received from the data collector 104. The data processing system 102 can include at least one path predictor 108 designed, constructed and operational to generate one or more paths using a model and based on the data received from the data collector 104, a current location of the user on the digital health map, one or more prescribed actions for the user. The data processing system 102 can include an action generator 110 designed, constructed and operational to generate one or more prescribed actions for the user. The action generator 110 can generate the prescribed actions based on one or more of the predicted health paths. For example, the action generator 110 can prescribe an action based on a desired destination associated with one or more of the predicted health paths.

The data processing system 102 can include, interface with, or otherwise access a data repository 112. The data repository 112 can include, store or maintain one or more data files, data structures, or other data store. The data repository 112 can include metrics 114. Metrics 114 can include health metrics such as a glucose level, weight, A1c %, blood pressure values, or health risk level. the data repository 112 can include a model 116. The model 116 can refer to or include a statistical model or a model generated or trained using a machine learning engine or technique. The data repository 112 can include a template 118. The template 118 can be used to generate a user interface to receive baseline data, or generate a digital health map. The data repository 112 can include actions 120. Actions 120 can include prescribed actions for a user to perform or execute.

Still referring to FIG. 1, and in further detail, the data processing system 102 can include a data collector 104. The data collector 104 can receive baseline data for a subject. The baseline data can include health metrics, behavioral metrics, and physical metrics. The baseline data can be for a baseline time interval, such as first time interval. The baseline time interval can refer to a time interval prior to the user performing the prescribed actions. The baseline time interval can refer to a historical time interval before a current time.

The baseline data can include, for example, health metrics such as body weight, resting heart rate, fasting blood sugar concentration, A1C %, or blood pressure. The baseline data can include behavioral metrics including, for example, a daily caloric intake or a daily number of steps. The baseline metrics can include physical metrics including, for example, age or height. The baseline data can include biological metrics. The baseline data can include demographic information.

The baseline data can include, for example, blood sugar values for the subject over the baseline time interval, resting heart rate values for the subject over the baseline time interval. The baseline data can include an indication of a sex of the subject, a body weight of the subject within the baseline time interval, a daily caloric intake for the subject within the baseline time interval, and a daily number of steps taken by the subject within the baseline time interval. The baseline data can include a fasting plasma glucose level or other indicator of blood glucose taken based on a time interval, such as every morning for a week or two weeks. The baseline data can be obtained, sensed, or determined via network connected devices, such as a fitness tracker computing device 130 worn by the user throughout the day.

The data collector 104 can receive health metrics including, for example, at least one of a) body mass index (BMI), b) metric of health risk, c) resting heart rate, d) current heart rate, e) fasting blood sugar concentration, f) A1C %, or g) blood pressure. The data collector 104 can receive behavioral metrics including, for example, at least one of a) a daily caloric intake, b) (e.g., daily) number of steps, c) frequency, duration, and intensity of activities or exercise, and/or d) duration or quality of sleep. The quality of sleep (e.g., sleep quality) may correspond to the duration of sleep (e.g., sleep duration). In some cases, sleep quality may include or correspond to at least one of sleep latency (e.g., time or duration until the subject or user fall asleep), sleep continuity (e.g., the ability to stay asleep), sleep timing (e.g., a time of day the subject sleeps), among others. Sleep quality (and/or sleep duration) may be measured or determined based on data from at least one sensor 132, such as at least the resting hearth rate. The data collector 104 can receive physical metrics including, for example, at least one of a) an age, b) a height, c) a body weight, d) muscle mass, or e) body fat percentage. The data collector 104 can receive biological metrics including, for example, at least one of gender or genetic information. The data collector 104 can receive other demographic information.

The data collector 104 can obtain the data from various data sources. The data collector 104 can obtain the data via network 101. The data collector 104 can obtain the data from the computing device 130, or sensor 132 associated with the computing device 130. The data collector 104 can obtain the data from one or more network connected devices that are communicatively coupled to the data processing system 102 via the network 101, such as a computing device 130, fitness tracker, internet-of-things device, network connected weigh scale, network connected glucose sensor, etc. In some cases, the data collector 104 can provide, for display via a computing device 130, a graphical user interface. The data collector 104 can receiver user input via the graphical user interface. The data collector 104 can receive user input via the graphical user interface. An example graphical user interface for user input is illustrated in FIG. 7. As shown in FIG. 7, the user can input, via an I/O device such as a keyboard, mouse, or touch interface, various data.

For example, to reduce fasting blood sugar levels, the data collector 104 can receive, through user input receive or from one or more network connected devices that are communicatively coupled to the data processing system 102, baseline data for a baseline period that includes: health metrics comprising at least one of a) body mass index (BMI), b) health risk, c) resting heart rate, d) current heart rate, e) fasting blood sugar concentration, or f) A1C %; behavioral metrics comprising at least one of a) a daily caloric intake, b) number of steps, c) frequency, duration, and intensity of activities or exercise, or d) duration or quality of sleep; physical metrics comprising at least one of a) an age, b) a height, c) a body weight, d) muscle mass, or e) body fat percentage; biological metrics comprising at least one of a) gender or b) genetic information; and demographic information comprising at least one of a) race or b) ethnicity, among others.

In another example, to reduce A1c % levels, the data collector 104 can receive through user input or from one or more network connected devices that are communicatively coupled to the data processing system 102, baseline data for a baseline period that includes health metrics that include at least one of a) body mass index (BMI), b) health risk, c) resting heart rate, d) current heart rate, e) fasting blood sugar concentration, and/or f) A1C %. The baseline data can include at least one of a) a daily caloric intake, b) number of steps, c) frequency, duration, and intensity of activities or exercise, or d) duration and quality of sleep. The baseline data can include at least one of a) an age, b) a height, c) a body weight, d) muscle mass, or e) body fat percentage. The baseline data can include biological metrics that can include at least one of a) gender or b) genetic information. The baseline data can include demographic information comprising race and/or ethnicity.

In yet another example, to reduce or manage (e.g., systolic or diastolic) blood pressure levels, such as to prevent an onset of hypertension or manage hypertension, the data collector 104 can receive through user input or from one or more network connected devices that are communicatively coupled to the data processing system 102, baseline data for a baseline period that includes health metrics that include at least one of a) body mass index (BMI), b) health risk, c) resting heart rate, d) current heart rate, and/or e) systolic and diastolic blood pressure values. The baseline data can include at least one of a) a daily caloric intake, b) number of steps, c) frequency, duration, and intensity of activities or exercise, or d) duration and quality of sleep. The baseline data can include at least one of a) an age, b) a height, c) a body weight, d) muscle mass, or e) body fat percentage. The baseline data can include biological metrics that can include at least one of a) gender or b) genetic information. The baseline data can include demographic information comprising at least one of a) race or b) ethnicity.

In further example, to reduce or manage BMI to prevent an onset of obesity, the data collector 104 can receive through user input or from one or more network connected devices that are communicatively coupled to the data processing system 102, baseline data for a baseline period that includes health metrics that include at least one of a) body mass index (BMI) or body weight or b) resting heart rate, etc. The baseline data can include behavioral metrics comprising at least one of a) a daily caloric intake, a daily number of steps, a duration of physical activity, a frequency of physical activity, an intensity of physical activity, and a daily sleep duration or quality. The baseline data can include physical metrics comprising at least one of a) age, b) height, or c) weight. The baseline data can include biological information comprising at least one of a) gender or b) genetic information. The baseline data can include demographic information comprising at least one of a) race or b) ethnicity.

In another example, to manage a health risk level metric, the data collector 104 can receive, through user input or from one or more network connected devices that are communicatively coupled to the data processing system 102, baseline data for a baseline period that includes health metrics include at least one of a) body mass index (BMI), b) health risk, c) resting heart rate, d) fasting blood glucose level, e) A1c %, and/or f) systolic and diastolic blood pressure levels. The baseline data can include behavioral metrics that include at least one of a) a daily caloric intake, b) number of steps, c) frequency, duration, and intensity of activities or exercise, or d) duration and quality of sleep. The baseline data can include physical metrics that include at least one of a) an age, b) a height, c) a body weight, d) muscle mass, or e) body fat percentage. The baseline data can include biological metrics that include at least one of a) gender or b) genetic information. The baseline data can include demographic information that include at least one of a) race, or b) ethnicity.

Thus, the data collector 104 can obtain data from one or more computing devices 130 or sensors 132. The data collector 104 can receive the data continuously, in real-time, or in a batch upload. The computing device 130 can push the data to the data processing system 102, or the data processing system 102 can fetch or request the data from one or more computing devices 130 associated with the user, such as via an electronic account that is linked to an online electronic account for the user in the data processing system 102.

Figure 3:
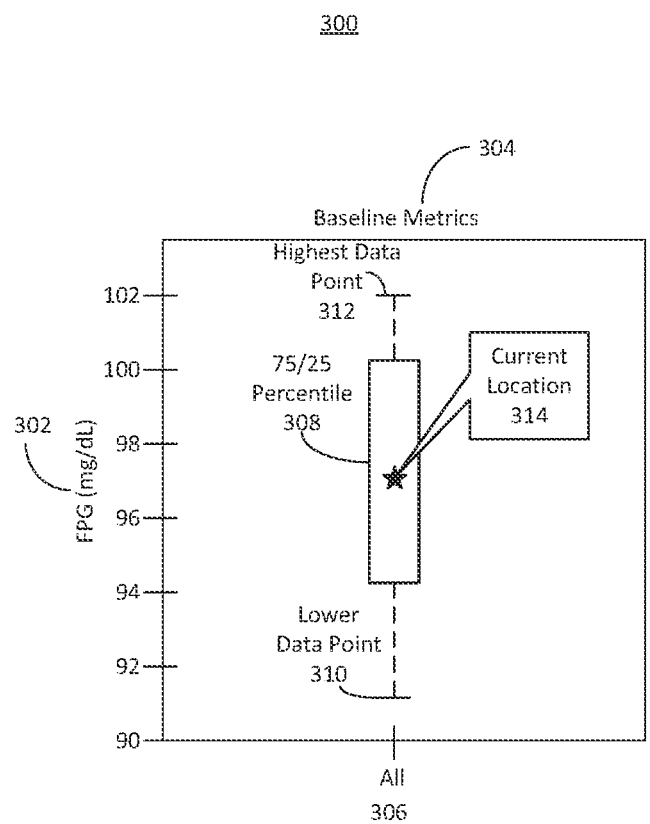
FIG. 3 depicts an example digital health map generated by a data processing system, in accordance with an implementation.
Figure 4:
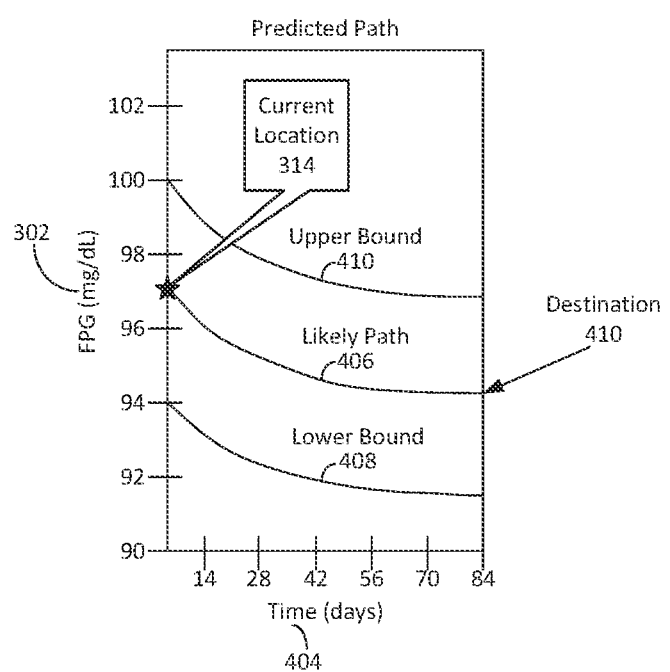
FIG. 4 depicts an example digital health map generated by a data processing system, in accordance with an implementation.
Figure 5:
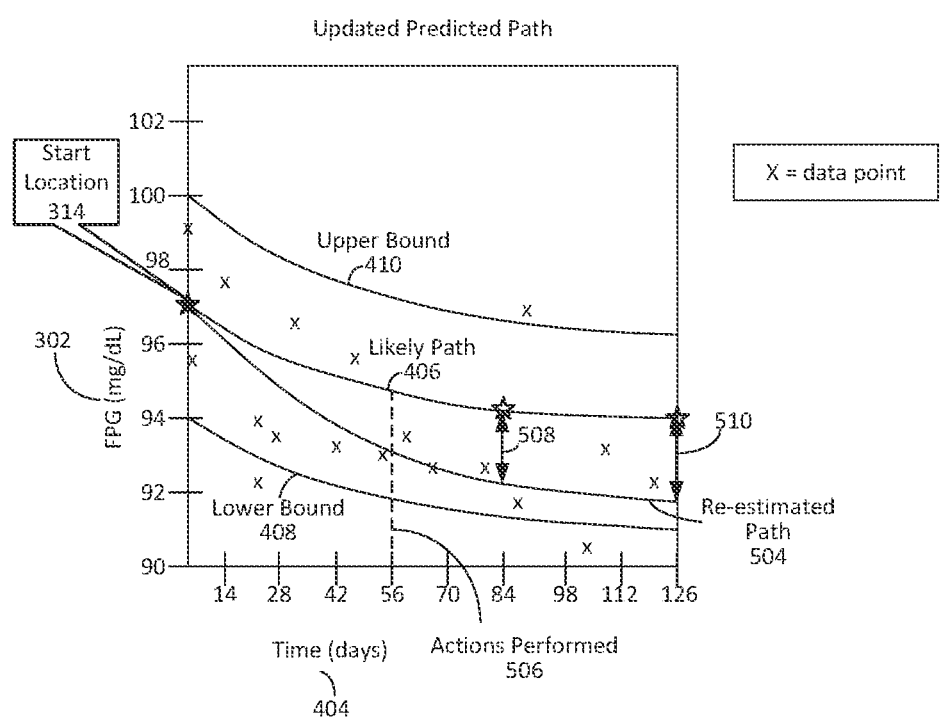
FIG. 5 depicts an example digital health map generated by a data processing system, in accordance with an implementation.

The location engine 106 can determine a current location of the user on a digital health map based on the data received from the data collector 104. The location engine 106 can establish, via a model 116, a current location of the subject on a digital health map based on at least a part of the baseline data, including, for example, at least one of the health metrics, the behavioral metrics, or the physical metrics. Example digital health maps are illustrated in FIGS. 3-5. An example current location is illustrated as current location 314 or start location 314 in FIGS. 3-5. The location engine 106 can generate the digital health map based on the type of health metric or type of destination the user desires. The location engine 106 can establish the digital health map with an x-axis corresponding to time, and a y-axis corresponding to a health metric, such as FPG, for example.

The data processing system 102 can include at least one path predictor 108 designed, constructed, and operational to generate one or more paths using a model and based on the data received from the data collector 104, a current location of the user on the digital health map, one or more prescribed actions for the user. The path predictor 108 can determine, based on the current location, the model, and one or more prescribed actions for the subject, a predicted path extending from the current location for a second time interval after the first time interval.

For example, the path predictor 108 can generate one or more predicted paths using a model that is based on a non-linear function or a linear function. The path predictor 108 can generate one or more predicted paths using a model that is based on an ordinary differential equation or a system of ordinary differential equations. The path predictor 108 can generate one or more predicted paths using a model based on a machine learning technique or a neural network technique.

To do so, the path predictor 108 can use inputs collected form the user to determine the response of the body of the user to specific exercise and diet prescription for the particular user. The inputs can include the baseline data, including information such as an exercise dose (e.g., type of exercise such as walking, running, swimming, heart level, etc.) or duration of exercise per week or the intensity of the exercise. The path predictor 108 can predict responses (e.g., outputs) that can include: 1) a change (improvement or decrease) in fasting blood glucose value over time predicted for the next 6 months, or 2) change (improvement) in body weight (or Body Mass Index—BMI) over time, or 3) change (improvement) in health risk over time.

The data processing system 102 can generate separate digital health maps for each health metric or a health map for a combined metric with the corresponding current locations, predicted responses or the predicted paths, and destinations. Depending on the "dose" of exercise and dietary caloric restriction, the data processing system 102 can provide multiple predicted paths for a particular metric leading to corresponding destinations. The user can choose a particular destination that suits their requirements and constraints. Once the destination on the map is chosen corresponding to a specific exercise and diet prescription, the data processing system 102 can continue to monitor the user's progress over the next time interval (e.g., 6 months), which can be referred to as a health transformation period, compared to the predicted path. Thus, the data processing system 102 can update the digital health map with the user's actual response and compare the actual response to the predicted path based on the baseline data and the selected actions. The data processing system 102 can continuously alert the user about their progress or lack of progress compared to the digital self or the digital twin of the user, and send corresponding messages to help them stay in the right course in the health map to get to the healthier destination. For example, the data collector 104 can continue to collect data from the computing device 130 or sensors 132, determine an updated current location, and render the updated current location on the digital health map with the predicted path.

The model 116 used by the path predictor 108 can include, for example, a set of differential equations. The inputs to the differential equation can include user specific information such as baseline fasting blood glucose value, sex, etc. The data processing system 102 can improve, tune, or update the model as more data is collected over time in order to improve the accuracy of the predicted paths generated or output by the model.

The path predictor 108 can input the current location determined from baseline data, and additional personal or demographic information, such as age, sex, weight, etc., into the model 116 to predict the outcome for the particular health parameter or metric for the particular user for a future time for a given prescription of health intervention (e.g., actions 120). The health intervention (e.g., action) can be a quantitatively personalized prescription (QPP) of exercise and diet. For example, in the case of the health parameter fasting blood glucose value (represented as FPG in FIGS. 3-5), the path predictor 108 can take certain inputs (e.g., current location of FPG or the baseline FPG value, sex, weight, etc.), and output the path of the FPG improvement over time for a particular QPP of weekly exercise and daily caloric deficit prescription. If the user executes the actions prescribed by the data processing system 102, the user's location will likely follow the path predicted by the data processing system 102 (e.g., path 406 as illustrated in FIG. 4.), within the most likely interval represented by an upper bound 410 and lower bound 408, thereby reaching the most likely destination 410.

The path predictor 108, using the model 116, can generate the predicted path on the health map. The model 116 can include or be based on a set of differential equations configured with certain model parameters. These model structure and parameters can represent certain aspects of human biology or physiology. The parameters of the model 116 can be estimated or determined using a function such as a nonlinear least square function (e.g., Levenberg-Marquardt) based on available data. The data processing system 102 can use other functions to estimate parameters for the model 116. In some cases, the model 116 can include or be based on a linear or a non-linear equation with different parameters, which may or may not represent the underlying physiology. In yet other cases the mathematical model 116 can include a machine learning model or a neural network, such as a convolution neural network with one or more hidden layers.

Thus, the path predictor 108 can use one or more types of models 116 to generate a predicted path from a current location to a new location in the digital health map for a particular user based on the user following a QPP. This path from the current location to the destination post-baseline duration can be referred to as a transformation phase or health transformation path that can help users navigate through the digital health map to improve or manage a health status and reach a healthier destination. The goal for the user is to be in a healthier zone (e.g., a zone below the likely path 406 in the digital health map shown in FIG. 4), by following at least the recommended amount of exercise duration, exercise type, exercise intensity, the daily caloric intake to at least the recommended level, the daily sleep duration, and the daily number of steps.

The data processing system 102 can include an action generator 110 designed, constructed, and operational to generate one or more prescribed actions for the user. The action generator 110 can generate the prescribed actions based on one or more of the predicted health paths. For example, the action generator 110 can prescribe an action based on a desired destination associated with one or more of the predicted health paths. The action generator 110 can obtain a set of predetermined or available actions from an action data structure 120 stored in data repository 112. The action generator 110 can determine a prescribed action based on a current location of the user in the digital health map, particular QPP of exercise and caloric restriction. The action generator 110 can determine which actions (or dose or QPP) will likely result in a desired destination for the user, and select one or more actions that will result in the predicted path.

The action generator 110 can receive one or more actions as user input and compute a predicted path based on the action. The action generator 110 can generate a customized action or exercise dose or duration, frequency, and intensity based on the current location and destination pursuant to a predicted path such that the user, following or executing the prescribed action, is likely to reach the destination. The action generator 110 can prescribe or generate various actions, including, for example, one or more of a duration and frequency of physical activity, an intensity of the physical activity, or a daily caloric intake. In some cases, actions can include, for example, a) frequency and duration of physical activity or exercise, b) an intensity of the physical activity or exercise measured as heart rate during the physical activity or exercise, c) a daily caloric intake, d) a daily number of steps, e) a daily sleep duration, or f) an amount of body weight loss during the health transformation period.

The data processing system 102 can generate, based on the model 116 and prescribed actions, an upper bound (e.g., 410) and a lower bound (e.g., 408) for the predicted path 406, wherein the upper bound and the lower bound represent an expected variability in data received for the subject.

The data processing system 102 can update the digital health map with the predicted path for the one or more prescribed actions for the subject, and transmit, to a computing device 130 of the subject, the digital health map to cause the computing device to render the digital health map via a display device coupled to the computing device.

The data processing system 102 can juxtapose the actual user data with the predicted health path in the digital health map of the user or of the digital twin, and compare the actual results of the user with the predicted results associated with the digital twin, and provide notifications or alerts to the user.

Figure 2:
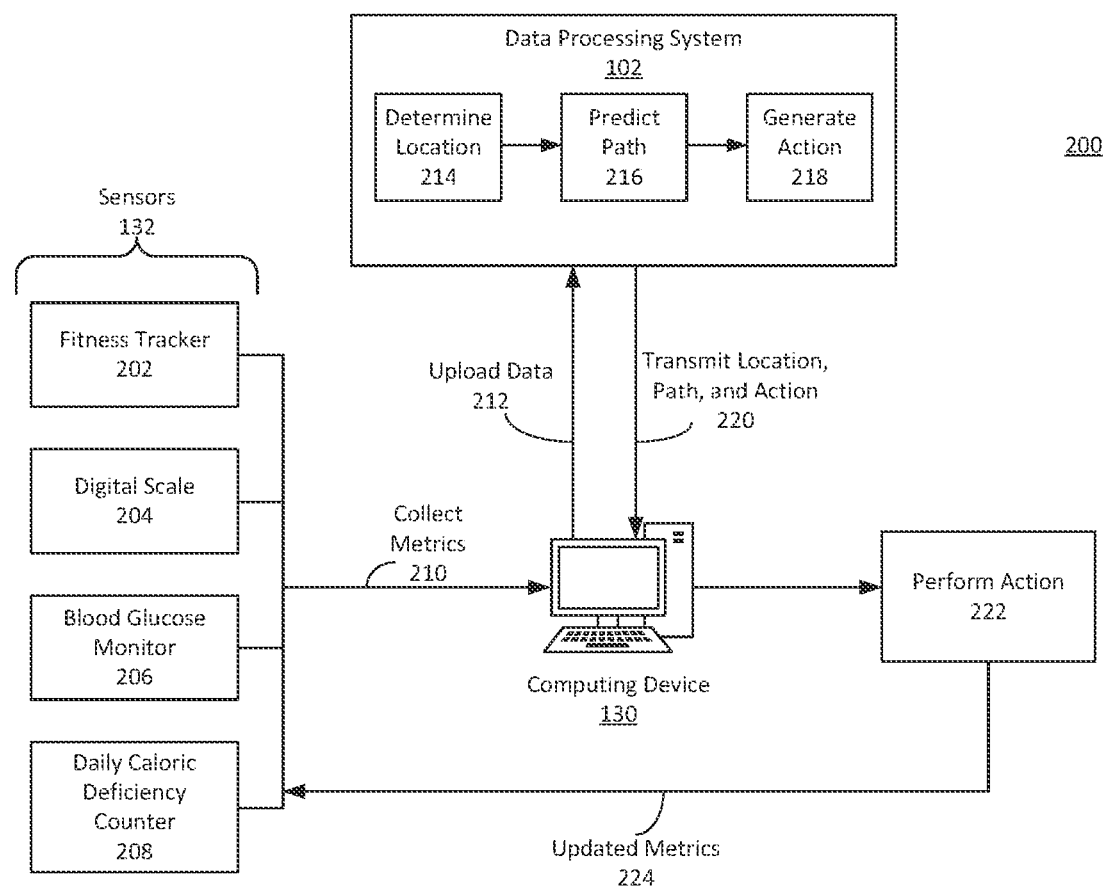
FIG. 2 depicts a block diagram illustrating an example operation of a system to generate a digital health map, in accordance with an implementation.

FIG. 2 depicts a block diagram illustrating an example operation of a system to generate a digital health map, in accordance with an implementation. The operation 200 can be performed by one or more system or component depicted in FIG. 1, including, for example, data processing system 102, computing device 130, and one or more sensors 132. At 210, the computing device 130 can collect metrics from one or more sensors 132. The computing device 130 can receive metrics from one or more sensors 132, such as a fitness tracker 202, digital scale 204, blood glucose monitor 206, or daily caloric deficiency counter 208. The computing device 130 can collect data from additional or different sensors 132.

At 212, the computing device can upload the collected metrics or data to the data processing system 102. The computing device 130 can upload or provide the metrics responsive to a request for data from the data processing system 102, or responsive to an instruction from a user of the computing device 130 to provide metrics or data to the data processing system 102. The computing device 130 can, in some cases, continuously or automatically provide the collected metrics in real-time to the data processing system 102.

At 214, the data processing system 102 can determine a current location. The current location can refer to a location on a digital health map. The data processing system 102 can determine the current location based on baseline data or other input data received from the computing device 130. At 216, the data processing system can predict a path. The data processing system 102 can use the baseline data, current location, a model, and other information to generate a predicted path from the current location to a destination. The predicted path can be based on execution of one or more prescribed actions. For example, the data processing system 102 can identify one or more actions that can be performed, and then generate predicted paths based on those actions. The data processing system 102 can then generate a likely path based on one or more actions for the user.

At 218, the data processing system can generate an action. The action can include or refer to a prescribed exercise "dose" described by its type, frequency, intensity, and/or duration. The data processing system 102 can determine which action to generate based on the predicted path and destination. For example, based on the current location, the data processing system 102 can determine that a first action may not result in a path that is likely to be followed or may not result in a desired destination for the health metric. Thus, the data processing system 102 can iterate through various actions or configurations of actions to identify one or more actions that result in a predicted path with a desired or desirable destination.

At 220, the data processing system 102 can transmit the current location, the predicted path, and the corresponding action to the computing device 130. The computing device 130 can render or otherwise present a digital health map with the current location, predicted path, destination, and corresponding one or more actions. At 222, the computing device 130, or user therefor, can perform the action. As the actions are executed or performed, the computing device 130 can collected updated metrics at 224. The computing device 130 can transmit or upload the updated metrics 224 to the data processing system 102, which can generate an updated current location. The data processing system 102 can update the digital health map with the updated current location, and re-estimate a new predicted path or juxtapose the updated current location alongside the previously predicted path.

FIG. 3 depicts an example digital health map generated by a data processing system, in accordance with an implementation. The digital health map 300 can be generated by one or more system or component depicted in FIG. 1, including, for example, the data processing system 102. The digital health map 300 can illustrate a user's current location 314. The data processing system 102 can generate the current location 314 based on baseline metrics 304. The data processing system 102 can generate the digital health map for a health metric, such as FPG (mg/dL). The data processing system 102 can generate the digital health map with a 75/25 percentile 308 that shows where the current location of the user falls within a statistic for this health metric. The statistic can be for the user based on historical user data, or for similar users based on a similarity characteristic (e.g., age, gender, etc.) The data processing system 102 can indicate on the digital health map a lower data point 310 and a highest data point 312.

FIG. 4 depicts an example digital health map generated by a data processing system, in accordance with an implementation. The digital health map 400 can be generated by one or more system or component depicted in FIG. 1, including, for example, the data processing system 102. The data processing system 102 can generate one or more predicted paths 406, 408 and 410. The likely predicted path 406 can reflect the most likely result for the user based on the current location of the user and one or more prescribed actions that will result in the a likely destination 410 for the health metric (e.g., FPG). The upper bound 410 illustrates a predicted path based on a higher starting location or less effective actions. The lower bound 408 reflects a predicted path based on a lower starting location or more effective actions, resulting in a lower destination. The digital health map 400 can be rendered with all three paths 406, 408 and 410.

FIG. 5 depicts an example digital health map generated by a data processing system, in accordance with an implementation. The digital health map 500 can be generated by one or more system or component depicted in FIG. 1, including, for example, the data processing system 102. The digital health map 500 can include the likely path 406, lower bound 408, and the upper bound 410. In an illustrative example, the upper bound 410 can be predicted for weekly exercise of 90 minutes, the likely path 406 can be predicted for weekly exercise of 150 minutes, and the lower bound can be predicted for weekly exercise of 240 minutes. The data processing system 102 can receive updated metrics from the computing device 130 and update the digital health map with the new metrics. For example, the data processing system 102 can generate updated locations based on the received metrics and update the digital health map with the locations. The data processing system 102 can compare the determined location with predicted locations on the predicted path to illustrate how the user is performing relative to a digital self of the user. The digital self can refer to the predicted likely path 406. The digital self can be expected to be at location 508 on the likely path 406 after 84 days, whereas the user may actually be on the re-estimated path 504 based on the metrics collected from the computing device 130. The data processing system 102 can generate the re-estimated path 504 based on the received metrics with a new destination that differs from the initially predicted destination 510. The re-estimated destination can be lower than the initially predicted destination, thereby illustrating an improved outcome for the user as the user performs actions 506.

Figure 6:
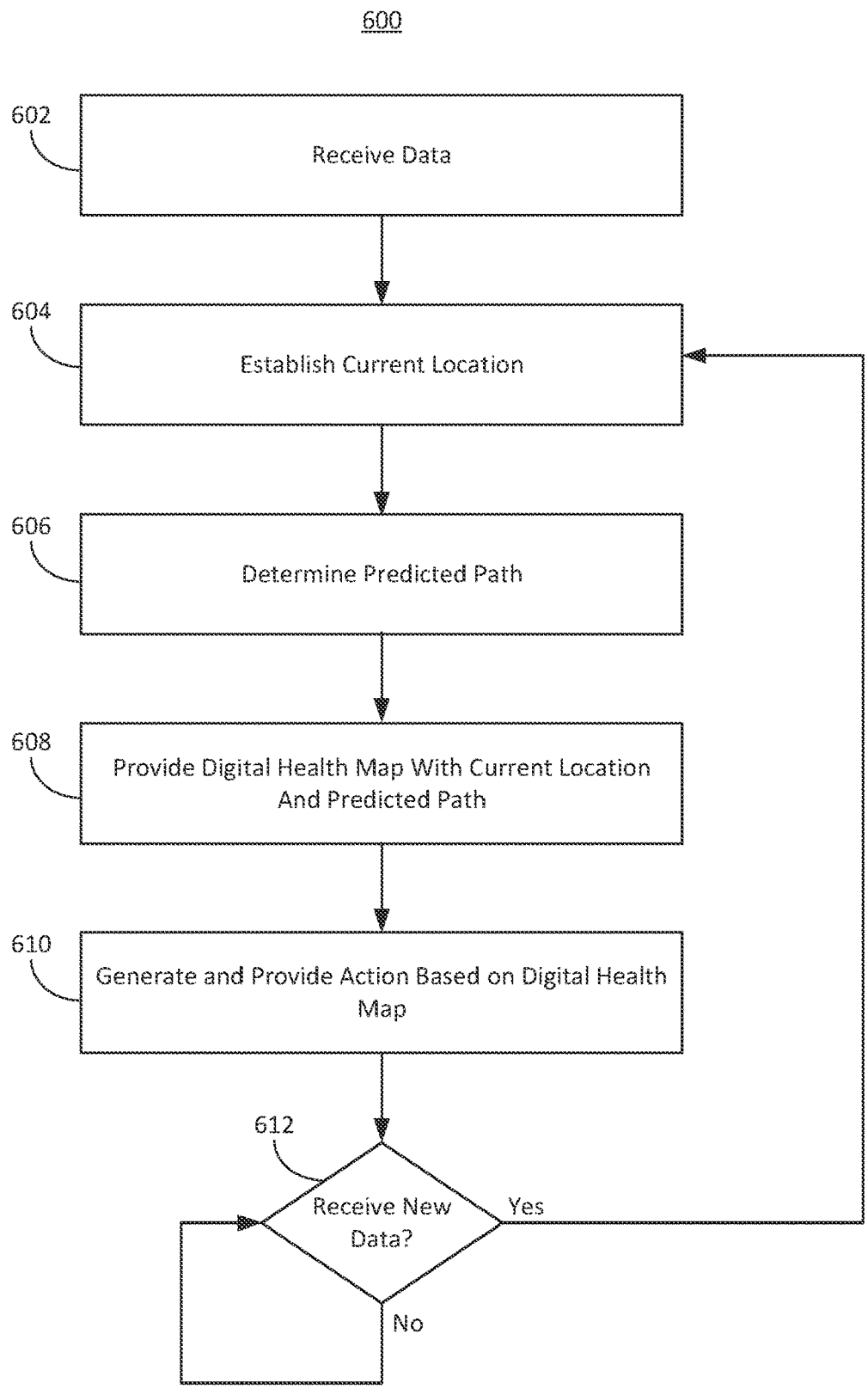
FIG. 6 depicts an example method of generating digital health map, in accordance with an implementation.

FIG. 6 depicts an example method of generating digital health map, in accordance with an implementation. The method 600 can be performed by one or more system or component depicted in FIG. 1 or FIG. 9, including, for example, a data processing system. At 602, the data processing system can receive data from one or more devices, such as a network connected device, mobile device, fitness tracker or other sensors. At 604, the data processing system can establish a current location for the user on a digital health map based on the received data. At 606, the data processing system can determine a predicted path using the current location, input data, and a model. At 608, the data processing system can provide the digital health map with the current location and predicted path to a computing device to render or display the digital health map on a display device of the computing device. At 610, the data processing system can generate and provide an action based on the digital health map. The action can correspond to the predicted health path. For example, the action can result in the health metric for the user following the predicted path. At 612, if the data processing system receives new data or updated metrics from the computing device, the data processing system can proceed to 604 to generate an updated current location and update the digital health map with the updated current location and a re-estimated predicted path based on the received new data. If the data processing system does not receive new data at 612, the data processing system can continue to wait until new data is received in order to update the digital health map.

FIG. 7 depicts an example user interface for inputting data for generation of a digital health map, in accordance with an implementation. The graphical user interface 700 can be generated or provided by the data processing system 102. The GUI 700 can be rendered or displayed on a computing device 130. The user of the computing device can input data via the GUI 700 and provide the data to the data processing system 102.

Figure 8:
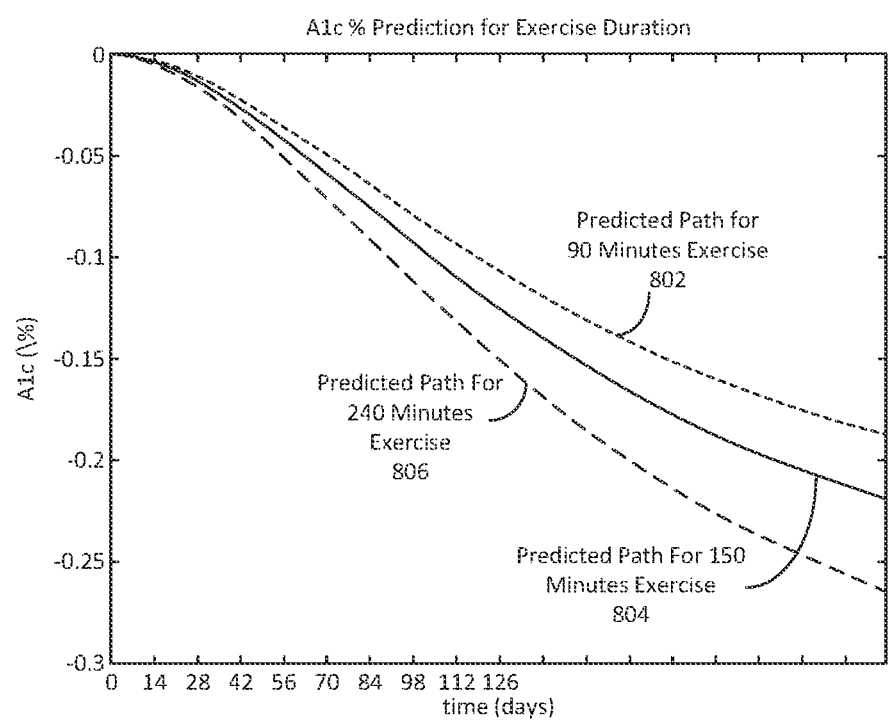
FIG. 8 depicts an example digital health map, in accordance with an implementation.

FIG. 8 depicts an example digital health map, in accordance with an implementation. The data processing system depicted in FIG. 1 can generate the digital health map 800 for the health metric A1c % levels. The x-axis can be days since the start location, and the y-axis can be the A1c %. The data processing system can generate different predicted paths based on the action. The actions can be, for example, weekly exercises of 90 minutes, 150 minutes, or 240 minutes, or any other duration of exercise that is predicted to maintain or improve a subject's health status. The data processing system 102 can generate a predicted path 802 based on the user performing 90 minutes of exercise; the predicted path 804 based on the user performing 150 minutes of exercise; and the predicted path 806 based on 240 minutes of exercise. Thus, the data processing system 102 can illustrated different predicted paths with different destinations for the health metric A1c % based on the action.

Figure 9:
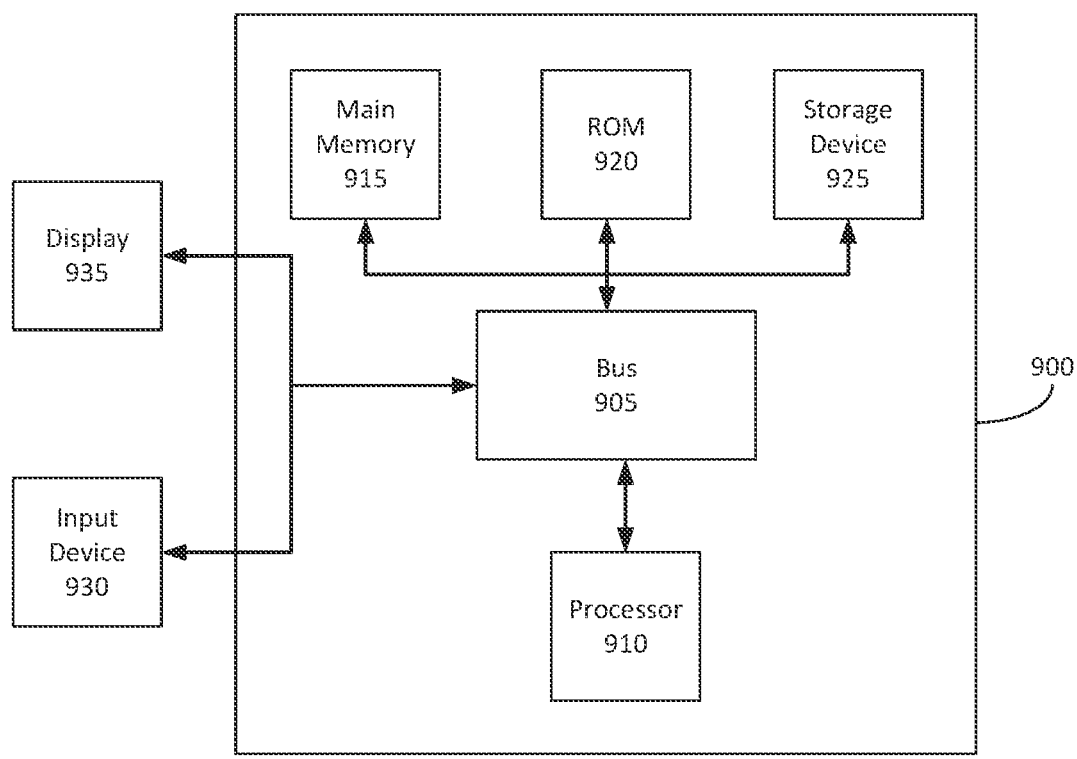
FIG. 9 is a block diagram illustrating an architecture for a computer system that can be employed to implement elements of the systems, flows and methods described and illustrated herein, including, for example, the systems depicted in FIGS. 1-2, the digital health maps depicted in FIGS. 3-6 and 8, the user interface depicted in FIG. 7, and the method depicted in FIG. 8.

FIG. 9 is a block diagram of an example computer system 900 that can be used to implement or perform one or more functionality or element of the systems, methods and apparatus of this disclosure. The computer system or computing device 900 can include or be used to implement the data processing system 102, or its components such as the data processing system 102. The computing system 900 includes at least one bus 905 or other communication component for communicating information and at least one processor 910 or processing circuit coupled to the bus 905 for processing information. The computing system 900 can also include one or more processors 910 or processing circuits coupled to the bus for processing information. The computing system 900 also includes at least one main memory 915, such as a random access memory (RAM) or other dynamic storage device, coupled to the bus 905 for storing information, and instructions to be executed by the processor 910. The computing system 900 may further include at least one read only memory (ROM) 920 or other static storage device coupled to the bus 905 for storing static information and instructions for the processor 910. A storage device 925, such as a solid state device, magnetic disk or optical disk, can be coupled to the bus 905 to persistently store information and instructions. The storage device 925 can include or be part of the memory 112.

The computing system 900 may be coupled via the bus 905 to a display 935, such as a liquid crystal display, or active matrix display, for displaying information to a user. An input device 930, such as a keyboard or voice interface may be coupled to the bus 905 for communicating information and commands to the processor 910. The input device 930 can include a touch screen display 935. The input device 930 can also include a cursor control, such as a mouse, a trackball, or cursor direction keys, for communicating direction information and command selections to the processor 910 and for controlling cursor movement on the display 935. The display 935 can be part of the data processing system 102, the computing device 130, or other component of FIG. 1.

The processes, systems and methods described herein can be implemented by the computing system 900 in response to the processor 910 executing an arrangement of instructions contained in main memory 915. Such instructions can be read into main memory 915 from another computer-readable medium, such as the storage device 925. Execution of the arrangement of instructions contained in main memory 915 causes the computing system 900 to perform the illustrative processes described herein. One or more processors in a multi-processing arrangement may also be employed to execute the instructions contained in main memory 915. Hard-wired circuitry can be used in place of or in combination with software instructions together with the systems and methods described herein. Systems and methods described herein are not limited to any specific combination of hardware circuitry and software.

Although an example computing system has been described in FIG. 1, the subject matter including the operations described in this specification can be implemented in other types of digital electronic circuitry, or in computer software, firmware, or hardware, including the structures disclosed in this specification and their structural equivalents, or in combinations of one or more of them.

Some of the description herein emphasizes the structural independence of the aspects of the system components illustrates one grouping of operations and responsibilities of these system components. Other groupings that execute similar overall operations are understood to be within the scope of the present application. Modules can be implemented in hardware or as computer instructions on a non-transient computer readable storage medium, and modules can be distributed across various hardware or computer based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C #, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

The systems and methods described herein may be embodied in other specific forms without departing from the characteristics thereof. Scope of the systems and methods described herein is thus indicated by the appended claims, rather than the foregoing description, and changes that come within the meaning and range of equivalency of the claims are embraced therein.

What is claimed is:

1. A system for localization on a digital health map, comprising:
    a data processing system comprising memory and one or more processors to:
    receive, for a subject, baseline data for a first time interval comprising health metrics, behavioral metrics, and physical metrics;
    establish, via a model, a current location of the subject on a digital health map based on the health metrics and at least one of the behavioral metrics or the physical metrics, wherein the digital health map comprises a first dimension corresponding to time and a second dimension corresponding to a health metric;
    determine, based on the model and one or more prescribed actions for the subject, a predicted path for the subject that extends along the first dimension and the second dimension from the current location and for a second time interval after the first time interval;
    update the digital health map with the predicted path, for the subject, determined based on the model and the one or more prescribed actions for the subject;
    receive, from one or more network connected devices that are communicatively coupled with the data processing system, updated data detected by one or more sensors corresponding to at least one of a health metric, a behavioral metric, or a physical metric;
    synchronize the model with the updated data to automatically:
        establish an updated current location based on the updated data;
        compare the updated current location with predicted locations on the predicted path;
        determine a re-estimated predicted path that extends beyond the current location for a third time interval based on the updated data; and
        update the digital health map with the re-estimated predicted path; and
    transmit, to a computing device of the subject, the digital health map, updated with the re-estimated predicted path based on the updated data received from the one or more network connected devices, to cause the computing device to render the digital health map on a graphical user interface via a display device coupled to the computing device.

2. The system of claim 1, wherein the data processing system is further configured to:
    receive, from one or more network connected devices that are communicatively coupled to the data processing system, the health metrics comprising at least one of body weight, resting heart rate, fasting blood sugar concentration, A1C %, or blood pressure.

3. The system of claim 1, wherein the data processing system is further configured to:
    receive the behavioral metrics comprising at least one of a daily caloric intake, a daily number of steps, a duration of physical activity, a frequency of physical activity, an intensity of physical activity, or a daily duration of sleep.

4. The system of claim 1, wherein the data processing system is further configured to:
    receive the physical metrics comprising at least one of an age or height.

5. The system of claim 1 wherein the data processing system is further configured to:
    receive biological metrics comprising at least one of gender or genetic information.

6. The system of claim 1 wherein the data processing system is further configured to:
    receive demographic information comprising at least one of ethnicity or race.

7. The system of claim 1, wherein the data processing system is further configured to:
    receive the baseline data comprising blood sugar values for the subject over the first time interval, resting heart rate values for the subject over the first time interval, an indication of a sex of the subject, a body weight of the subject within the first time interval, a daily caloric intake for the subject within the first time interval, a duration of physical activity, a frequency of physical activity, an intensity of physical activity, and a daily number of steps taken by the subject within the first time interval.

8. The system of claim 1, wherein the data processing system is further configured to:
generate the digital health map using the model based on a non-linear function or a linear function.

9. The system of claim 1, wherein the data processing system is further configured to:
generate the digital health map using the model based on an ordinary differential equation.

10. The system of claim 1, wherein the data processing system is further configured to:
generate the digital health map using the model based on a machine learning technique or a neural network technique.

11. The system of claim 1, wherein the one or more prescribed actions comprise at least one of a duration of daily physical activity, an intensity of the daily physical activity, a daily sleep duration, a daily number of steps, or a daily caloric intake.

12. The system of claim 1, wherein the data processing system is further configured to:
generate, based on the model, an upper bound and a lower bound for the predicted path, wherein the upper bound and the lower bound represent an expected variability in data received for the subject.

13. A system to reduce fasting blood sugar levels in a subject to prevent an onset of diabetes or manage diabetes in the subject, comprising:
a data processing system comprising memory and one or more processors to:
receive, for a subject, baseline data for a first time interval comprising:
health metrics comprising a body weight, resting heart rate, fasting blood sugar concentration, and A1C %;
behavioral metrics comprising daily caloric intake, daily number of steps, a duration of physical activity, a frequency of physical activity, an intensity of physical activity, and a daily sleep duration;
physical metrics comprising age, height, and weight;
biological and demographic information comprising gender, race, and ethnicity; and
establish, via a model, a current location of the subject on a digital health map based on the health metrics and at least one of the behavioral metrics, the physical metrics, or the biological and demographic information, wherein the digital health map comprises a first dimension corresponding to time and a second dimension corresponding to a health metric;
determine, based on the model, one or more prescribed actions comprising an exercise duration, an exercise frequency, an exercise intensity, and a daily caloric intake;
generate, based on the model and the one or prescribed actions, a predicted path for the subject that extends along the first dimension and the second dimension from the current location on the digital health map and for a second time interval after the first time interval;
update the digital health map with the predicted path, for the subject, determined based on the model and the one or more prescribed actions for the subject;
receive, from one or more network connected devices that are communicatively coupled with the data processing system, updated data corresponding to at least one of a health metric, a behavioral metric, or a physical metric;
synchronize the model with the updated data to automatically:
establish an updated current location based on the updated data;
compare the updated current location with predicted locations on the predicted path;
determine a re-estimated predicted path that extends beyond the current location for a third time interval based on the updated data; and
update the digital health map with the re-estimated predicted path; and
transmit, to a computing device of the subject, the digital health map, updated with the re-estimated predicted path based on the updated data received from the one or more network connected devices, to cause the computing device to render the digital health map on a graphical user interface via a display device coupled to the computing device.

14. The system of claim 13, wherein the data processing system is further configured to:
receive at least a portion of the baseline data from a wearable network-connected device.

15. The system of claim 13, wherein the data processing system is further configured to:
determine a dose for the subject comprising the one or more prescribed actions.

16. A method for localization on a digital health map, comprising:
receiving, by a data processing system comprising one or more processors, for a subject, baseline data for a first time interval comprising health metrics, behavioral metrics, and physical metrics;
establishing, by the data processing system via a model, a current location of the subject on a digital health map based on the health metrics and at least one of the behavioral metrics or the physical metrics, wherein the digital health map comprises a first dimension corresponding to time and a second dimension corresponding to a health metric;
determining, by the data processing system based on the model and one or more prescribed actions for the subject, a predicted path for the subject that extends along the first dimension and the second dimension from the current location and for a second time interval after the first time interval;
updating, by the data processing system, the digital health map with the predicted path, for the subject, determined based on the model and the one or more prescribed actions for the subject;
receiving, by the data processing system, from one or more network connected devices that are communicatively coupled with the data processing system, updated data corresponding to at least one of a health metric, a behavioral metric, or a physical metric;
synchronizing, by the data processing system, the model with the updated data to automatically:
establish an updated current location based on the updated data;
compare the updated current location with predicted locations on the predicted path;
determine a re-estimated predicted path that extends beyond the current location for a time interval based on the updated data; and
update the digital health map with the re-estimated predicted path; and transmitting, by the data processing system to a computing device of the subject, the digital health map, updated with the re-estimated predicted path based on the updated data received from the one or more network connected devices, to cause the computing device to render the digital health map on a graphical user interface via a display device coupled to the computing device.

17. The method of claim 16, comprising:

receiving, by the data processing system from one or more network connected devices that are communicatively coupled to the data processing system, the health metrics comprising at least one of body weight, resting heart rate, fasting blood sugar concentration, A1C %, or blood pressure.

18. The method of claim 16, comprising:

receiving, by the data processing system, the behavioral metrics comprising at least one of a daily caloric intake, a daily number of steps, a duration of physical activity, a frequency of physical activity, an intensity of physical activity, or a daily duration of sleep; and receiving, by the data processing system, the physical metrics comprising at least one of an age or height.

19. The method of claim 16, comprising:

receiving, by the data processing system, the baseline data comprising blood sugar values for the subject over the first time interval, resting heart rate values for the subject over the first time interval, an indication of a sex of the subject, a body weight of the subject within the first time interval, a daily caloric intake for the subject within the first time interval, a duration of physical activity, a frequency of physical activity, an intensity of physical activity, and a daily number of steps taken by the subject within the first time interval.

20. The method of claim 16, comprising:

generating, by the data processing system, the digital health map using the model based on a non-linear function, a linear function, an ordinary differential equation, a machine learning technique, or a neural network technique.

* * * * *